Patented Nov. 17, 1936

2,061,136

UNITED STATES PATENT OFFICE 2,061,136

PROCESS OF PREPARING RACEMIC COMPOUNDS OF THE 1-HYDROXYPHENYL-2-AMINOPROPAN-1-OL SERIES

Max Bockmühl, Gustav Ehrhart, and Leonhard Stein, Frankfort-on-the-Main, Germany, assignors to Winthrop Chemical Company, Inc., New York, N. Y., a corporation of New York No Drawing. Application July 15, 1932, Serial No. 622,820. In Germany July 25, 1931

4 Claims. (Cl. 260—128.5)

The present invention relates to a process of preparing racemic compounds of the 1-hydroxyphenyl-2-aminopropan-1-ol series.

We have found that by catalytically reducing at an elevated temperature optically active 1-hydroxyphenylpropan-2-on-1-ols of the following general formula

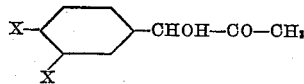

wherein at least one X stands for hydroxy, the other X for hydroxy or hydrogen, in the presence of ammonia or primary amines, there are obtained racemic 1-hydroxyphenyl-2-aminopropan-1-ols of the following general formula

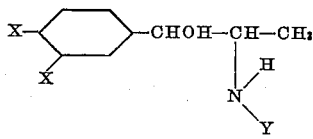

wherein at least one X stands for hydroxy, the other X for hydroxy or hydrogen, and Y stands for hydrogen, alkyl or aralkyl.

The reaction may be carried out in the presence of precious metal catalysts, such as platinum or palladium catalysts, as well as in the presence of catalysts of the nickel group, e. g. nickel, cobalt, iron catalysts, or in the presence of a copper catalyst. When using precious metal catalysts, the reaction is preferably carried out at a moderately elevated temperature, say at between about 40° C. and about 80° C., for instance at a temperature of about 50° C. When using a catalyst of the nickel group, the reaction is preferably carried out at a temperature of about 60° C. to about 180° C., e. g. at a temperature of about 80° C. In each case the temperature is to be adapted to the nature of the catalyst, so that it may be necessary to raise the temperature to a higher degree when using a catalyst of a small activity, whereas a highly active catalyst may allow the reaction to be carried out at a lower temperature.

When using ammonia or aralkyl amines compounds with primary amino-groups are obtained, whereas when using alkylamines the corresponding alkylamino-compounds are obtained. However, when using aralkylamines in the presence of a catalyst of the nickel group the corresponding aralkylamino-compound is formed so that in order to obtain the primary amino-compound a further hydrogenation in the presence of a precious metal catalyst is necessary; hereby the aralkyl-group is split off. When using aralkylamines in the presence of a precious metal catalyst, the compound containing a primary amino group is immediately obtained.

The reaction is preferably carried out in an alcoholic solution.

Since the optically active hydroxyphenylacetylcarbinols used constitute starting materials which are very easily accessible, the process represents a considerable advance compared with the methods of preparation hitherto known for the amino alcohols important as remedies.

The following examples illustrate the invention.

(1) 33 grams of levo-meta-hydroxyphenylacetylcarbinol, 23 grams of benzyl amine and 250 cc. of alcohol are hydrogenated with palladium at 40° C.–50° C. As soon as the absorption of hydrogen is complete, the catalyst is filtered by suction and the alcohol is distilled in a vacuum; the residue is dissolved in water and the portions which are insoluble in water are extracted with ether. The aqueous extract is rendered acid by means of hydrochloric acid and evaporated to dryness in a vacuum. The crystalline mass obtained is redissolved from propyl alcohol and ether. There are obtained 30 grams of racemic meta-hydroxyphenylpropanolamine-hydrochloride melting at 178° C.

(2) 33 grams of levo-meta-hydroxyphenylacetylcarbinol are dissolved in 250 cc. of alcohol and, after addition of 21.5 grams of benzyl amine, hydrogenated at about 80° C. with nickel and hydrogen. After 1 molecular proportion of hydrogen has been absorbed, the absorption of hydrogen is complete. The solution is freed from the nickel catalyst by filtration; it is then concentrated under reduced pressure and the residue obtained is thoroughly stirred with low-boiling petroleum ether. The portion which is insoluble in petroleum ether is neutralized with alcoholic hydrochloric acid and mixed with ether until it begins to become turbid. After some time the racemic meta-hydroxyphenylbenzylaminopropanol-hydrochloride crystallizes on cooling; after recrystallization from a small quantity of water, it melts at 168° C.

In order to split off the benzyl group, 30 grams of the hydrochloride obtained are dissolved in 500 cc. of alcohol and the solution is completely hydrogenated with palladium and hydrogen. The liquid is freed from the catalyst by filtering with suction; it is concentrated under reduced pressure and stirred with acetone. The racemic meta-hydroxyphenylaminopropanol-hydrochloride crystallizes at once; it is filtered by suction and recrystallized from propyl alcohol with addition of ether. It melts at 178° C.

(3) 8.3 grams of levo-meta-hydroxyphenyl-acetylcarbinol are dissolved in 200 cc. of an alcoholic ammonia solution of at least 5% strength; after addition of activated palladium, the solution is hydrogenated with hydrogen, while gently heating. After the calculated quantity of hydrogen has been absorbed, the catalyst is filtered by suction; the excess of alcohol is distilled in a vacuum and the completely dry residue is mixed, while stirring, with alcoholic hydrochloric acid until the reaction is acid to Congo paper. On addition of acetone the racemic meta-hydroxyphenylaminopropanol-hydrochloride crystallizes; after recrystallization from propyl alcohol with addition of ether, it melts at 178° C.

(4) 16.6 grams of levo-para-hydroxyphenyl-acetylcarbinol are dissolved in 200 cc. of alcohol and, after addition of 10.5 grams of benzyl amine, hydrogenated at about 80° C. with nickel and hydrogen. After the absorption of hydrogen is complete, the nickel catalyst is separated by filtration and the solution is concentrated in a vacuum. An oil remains which is thoroughly mixed, while stirring, with low-boiling petroleum ether. The portion which is insoluble in petroleum ether, is neutralized with alcoholic hydrochloric acid and, after diluting with alcohol, completely hydrogenated with palladium and hydrogen. The catalyst is then filtered by suction and the alcoholic liquid is concentrated under reduced pressure. The racemic para-hydroxyphenylaminopropanol-hydrochloride remains which, when recrystallized from methanol and with addition of ether, melts at 207° C. with decomposition.

(5) 18.2 grams of levo-3,4-dihydroxyphenyl-acetylcarbinol and 10.5 grams of benzyl amine are hydrogenated in an alcoholic solution at about 50° C. with palladium and hydrogen. As soon as the absorption of hydrogen is complete, the catalyst is filtered by suction and the alcoholic liquid is evaporated under reduced pressure. The residue is neutralized with alcoholic hydrochloric acid and evaporated to dryness. The residue is dissolved in water and mixed with an ammonia solution until the reaction is alkaline. The racemic 3,4-dihydroxyphenylaminopropanol separates in a crystalline form; it is filtered by suction and washed with a small quantity of water. By neutralization with alcoholic hydrochloric acid, the hydrochloride is formed which, when recrystallized from methanol and ether, melts at 178° C. to 180° C.

(6) 8.0 grams of levo-meta-hydroxyphenyl-acetylcarbinol are dissolved in 7.5 grams of an alcoholic methylamine solution of 20 per cent. strength, the solution is diluted with 50 cc. of absolute alcohol and hydrogenated at a temperature of 50° C. with platinum and hydrogen. After the calculated quantity of hydrogen has been absorbed, the catalyst is filtered by suction and the excess of alcohol is eliminated in a vacuum. The residue is neutralized by means of alcoholic hydrochloric acid, whereupon the hydrochloride crystallizes after a short time. The racemic 1-meta-hydroxyphenyl-2-methylamino-propan-1-ol hydrochloride is recrystallized from methanol while adding ether. The racemic compound melts at 185° C. to 186° C.

We claim:

1. The process of preparing racemic compounds of the 1-hydroxyphenyl-2-aminopropan-1-ol series which comprises reducing at a temperature between about 40° C. and about 80° C. a levo-compound of the following general formula

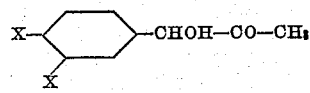

wherein at least one X stands for hydroxy, the other X stands for one of the group consisting of hydroxy and hydrogen, in the presence of a compound of the following general formula $NH_2-Y$ wherein Y stands for one of the group consisting of hydrogen, alkyl and benzyl, by means of hydrogen and a metal hydrogenation catalyst.

2. The process of preparing a racemic compound of the 1-hydroxyphenyl-2-aminopropan-1-ol series which comprises reducing in an alcoholic solution and at a temperature of about 40° C. to about 80° C. levo-1-meta-hydroxyphenyl-propan-2-on-1-ol in the presence of benzylamine by means of hydrogen and a palladium catalyst.

3. The process of preparing a racemic compound of the 1-hydroxyphenyl-2-aminopropan-1-ol series which comprises reducing in an alcoholic solution and at a temperature of about 60° C. to about 80° C. levo-1-meta-hydroxyphenyl-propan-2-on-1-ol in the presence of benzylamine by means of hydrogen and a nickel catalyst.

4. The process of preparing a racemic compound of the 1-hydroxyphenyl-2-aminopropan-1-ol series which comprises reducing in an alcoholic solution and at a temperature of about 40° C. to about 80° C. levo-1-(3',4'-dihydroxy)-phenylpropan-2-on-1-ol in the presence of benzylamine by means of hydrogen and a palladium catalyst.

MAX BOCKMÜHL.
GUSTAV EHRHART.
LEONHARD STEIN.